United States Patent
Ro (10) Patent No.: US 9,147,908 B2
(45) Date of Patent: Sep. 29, 2015

(54) LITHIUM SECONDARY BATTERY

(75) Inventor: Huntae Ro, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 252 days.

(21) Appl. No.: 13/348,664

(22) Filed: Jan. 12, 2012

(65) Prior Publication Data

US 2012/0315513 A1  Dec. 13, 2012

(30) Foreign Application Priority Data

Jun. 13, 2011  (KR) .................. 10-2011-0056632

(51) Int. Cl.
| | | |
|---|---|---|
| *H01M 2/12* | (2006.01) | |
| *H01M 10/0587* | (2010.01) | |
| *H01M 2/04* | (2006.01) | |
| *H01M 2/18* | (2006.01) | |
| *H01M 2/34* | (2006.01) | |
| *H01M 10/04* | (2006.01) | |
| *H01M 10/052* | (2010.01) | |

(52) U.S. Cl.
CPC ........ *H01M 10/0587* (2013.01); *H01M 2/0413* (2013.01); *H01M 2/1241* (2013.01); *H01M 2/18* (2013.01); *H01M 2/345* (2013.01); *H01M 2/12* (2013.01); *H01M 10/0431* (2013.01); *H01M 10/052* (2013.01)

(58) Field of Classification Search
CPC ... H01M 10/0587; H01M 2/345; H01M 2/18; H01M 10/052; H01M 10/0431; H01M 2/12; H01M 2/0413; H01M 2/1241; H01M 2/1211; H01M 2/046; H01M 2/124

USPC ................. 429/53, 72, 82, 163, 164
See application file for complete search history.

(56) References Cited

U.S. PATENT DOCUMENTS

| | | | |
|---|---|---|---|
| 6,413,666 B1 * | 7/2002 | Oya | 429/53 |
| 2008/0107957 A1 * | 5/2008 | Meguro et al. | 429/56 |
| 2010/0183910 A1 * | 7/2010 | Nishino et al. | 429/163 |

FOREIGN PATENT DOCUMENTS

| | | |
|---|---|---|
| JP | 07-014555 | 1/1995 |
| JP | 2002-184391 A | 6/2002 |
| KR | 10 2008-0058966 A | 6/2008 |
| KR | 10-2008-0058966 A | 6/2008 |
| KR | 10 2009-0062541 A | 6/2009 |
| KR | 10-2009-0062541 A | 6/2009 |

OTHER PUBLICATIONS

Korean Notice of Allowance in KR 10-2011-0056632, dated Oct. 30, 2012 (RO).

* cited by examiner

*Primary Examiner* — Jonathan Jelsma
*Assistant Examiner* — Omar Kekia
(74) *Attorney, Agent, or Firm* — Lee & Morse, P.C.

(57) ABSTRACT

A lithium secondary battery including an electrode assembly; a can accommodating the electrode assembly; a cap assembly coupled with the can, the cap assembly being positioned at a topmost part of the can and having an upper cap including gas discharge holes therein; and a washer coupled with the upper cap, wherein the washer includes a body part, the body part having a flat plate shape and having a centrally disposed connection hole; and insertion parts, the insertion parts extending toward a center of the connection hole from the body part and being arranged in the gas discharge holes.

18 Claims, 7 Drawing Sheets

LITHIUM SECONDARY BATTERY

BACKGROUND

1. Field

Embodiments relate to a lithium secondary battery.

2. Description of the Related Art

A lithium secondary battery may include an electrode assembly (having a positive electrode plate coated with a positive electrode active material, a negative electrode plate coated with a negative electrode active material, and a separator between the positive electrode plate and the negative electrode plate, wound together), a can accommodating the electrode assembly, and a cap assembly sealing or coupled with an upper portion of the can.

SUMMARY

Embodiments are directed to a lithium secondary battery.

The embodiments may be realized by providing a lithium secondary battery including an electrode assembly; a can accommodating the electrode assembly; a cap assembly coupled with the can, the cap assembly being positioned at a topmost part of the can and having an upper cap including gas discharge holes therein; and a washer coupled with the upper cap, wherein the washer includes a body part, the body part having a flat plate shape and having a centrally disposed connection hole; and insertion parts, the insertion parts extending toward a center of the connection hole from the body part and being arranged in the gas discharge holes.

The upper cap may include a protruding part extending from a center of the upper cap, a connection part extending downwardly from an outer periphery of the protruding part, the connection part including the gas discharge holes, and a flange part extending outwardly from the connection part.

Each of the insertion parts may include an extension part extending inwardly from the body part, and a locking part formed at an end of the extension part.

The locking part may have a width greater than a minimum width of the extension part.

The locking part and a portion of the extension part adjacent thereto may each have a width smaller than a width of one of the gas discharge holes.

The locking part may have a circular shape.

The locking part may have a rectangular shape.

The locking part may have a funnel shape.

The locking part may have a triangular shape.

The locking part may protrude upwardly toward the upper cap from the body part.

The washer may have a lid portion extending along an outer periphery of the body part and covering an upper surface of the can.

An inner diameter of the lid portion may be greater than an outer diameter of the upper cap.

The lithium secondary battery may further include a heat shrinkable tube on an exterior of the can.

The heat shrinkable tube may cover the coupled washer and upper cap.

The washer may be formed of an insulator.

BRIEF DESCRIPTION OF THE DRAWINGS

The embodiments will become apparent to those of ordinary skill in the art by describing in detail exemplary embodiments with reference to the attached drawings, in which.

DETAILED DESCRIPTION

Korean Patent Application No. 10-2011-0056632, filed on Jun. 13, 2011, in the Korean Intellectual Property Office, and entitled: "Lithium Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
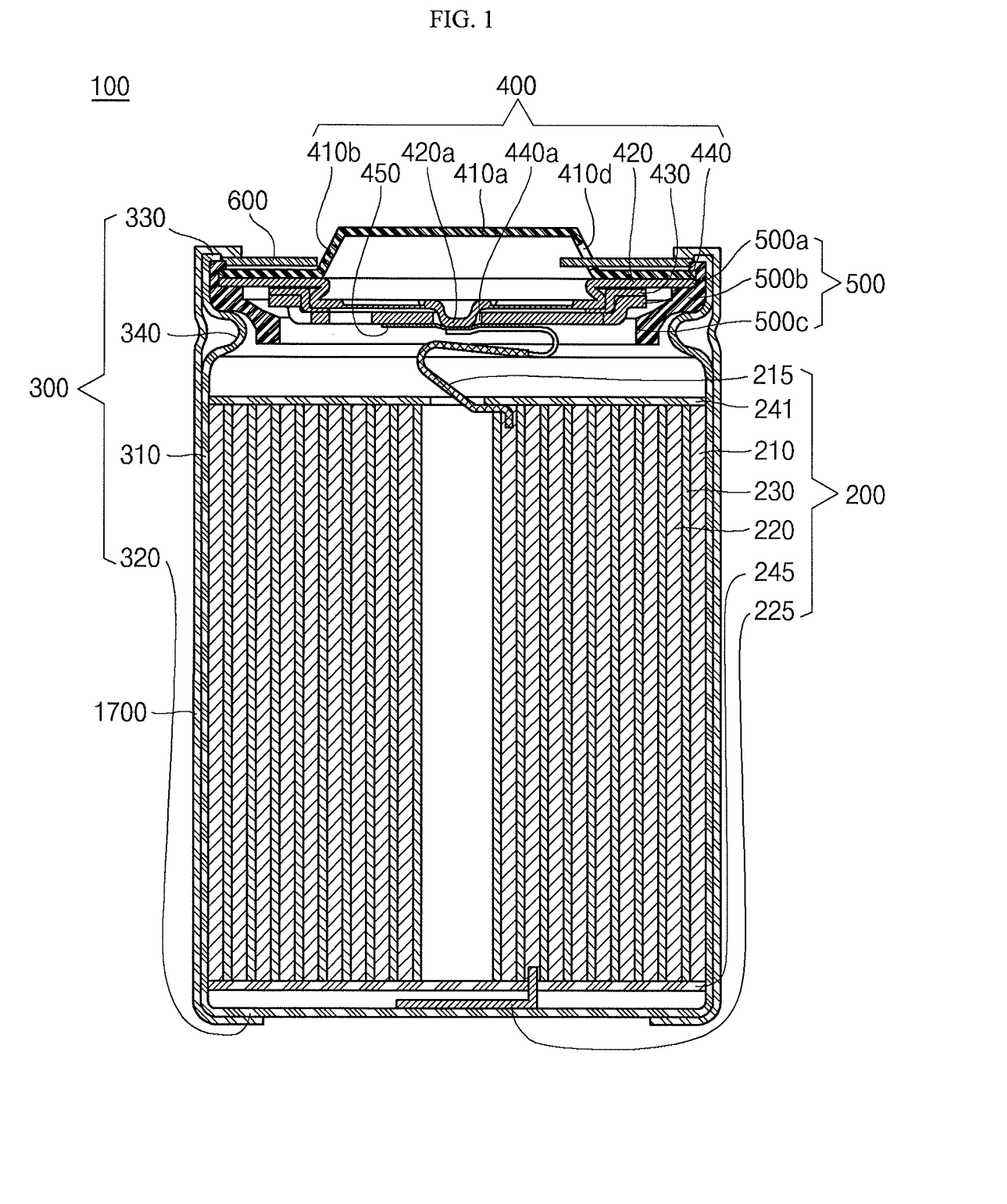
FIG. 1 illustrates a cross-sectional view of a lithium secondary battery according to an embodiment.
Figure 2:
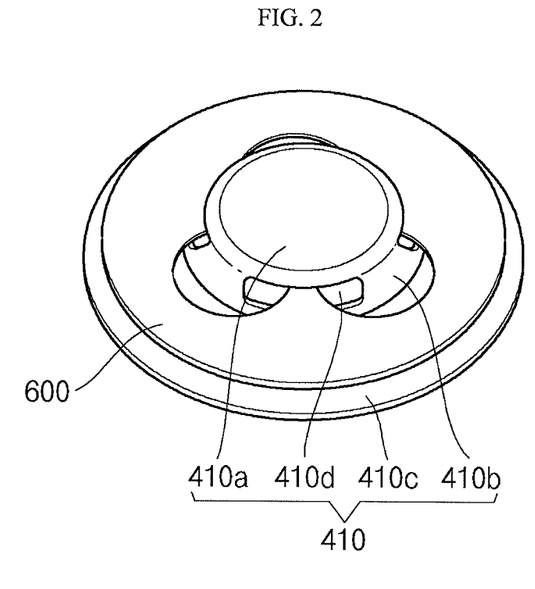
FIG. 2 illustrates a perspective view of a connection relationship between a washer and an upper cap in the lithium secondary battery of FIG. 1.
Figure 3:
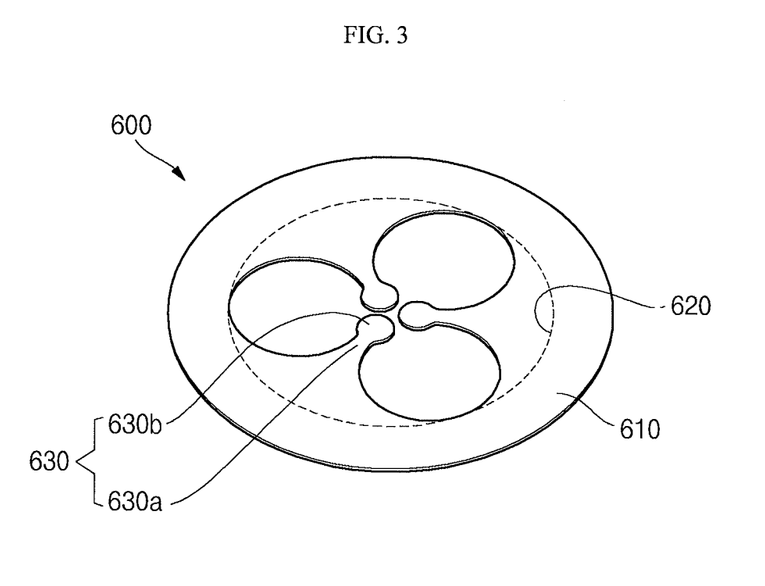
FIG. 3 illustrates a perspective view of the washer of FIG. 2.

FIG. 1 illustrates a cross-sectional view of a lithium secondary battery according to an embodiment. FIG. 2 illustrates a perspective view of a connection relationship between a washer and an upper cap in the lithium secondary battery of FIG. 1. FIG. 3 illustrates a perspective view of the washer of FIG. 2.

Referring to FIG. 1, the lithium secondary battery 100 may include an electrode assembly 200, a cylindrical can 300, a cap assembly 400, a gasket 500, a washer 600, and a heat shrinkable tube 1700.

In the lithium secondary battery 100, the electrode assembly 200 may be inserted into the cylindrical can 300 together with an electrolyte (not illustrated). The cap assembly 400 may be coupled with an upper portion of the cylindrical can 300 to seal the cylindrical can 300; and current generated in the electrode assembly 200 may flow to an external device or load. The gasket 500 may be disposed between inner walls of the cylindrical can 300 and the cap assembly 400, thereby helping improve sealing efficiency of the cylindrical can 300.

The electrode assembly 200 may include a positive electrode plate 210 (having a positive active material layer coated on a surface of a positive current collector), a negative electrode plate 220 (having a negative active material layer coated on a surface of a negative current collector), and a separator 230 between the positive electrode plate 210 and the negative electrode plate 220. In the electrode assembly 200, the separator 230 (electrically insulating the positive electrode plate 210 and the negative electrode plate 220 from each other) may be wound with the positive electrode plate 210 and the negative electrode plate 220 in a jelly-roll configuration. The electrode assembly 200 may further include insulation plates 241 and 245 at top and bottom portions thereof to help prevent the electrode assembly 200 from contacting the cap assembly 400 or the cylindrical can 300.

The positive electrode plate 210 may include a positive current collector (made of a highly conductive material plate, e.g., an aluminum (Al) foil) and a positive active material layer coated on surfaces of the positive current collector, e.g., coating on both opposing surfaces. A positive current collector region (in which the positive active material layer is not formed, e.g., a positive electrode uncoated region) may be formed at ends of the positive electrode plate 210, e.g., at both opposing ends of the positive electrode plate 210. One end of the positive electrode uncoated region may generally be made of an aluminum (Al) material; and a positive electrode tab 215 (upwardly protruding to the electrode assembly 200 by a predetermined length) may be attached to the one end of the positive electrode uncoated region.

The negative electrode plate 220 may include a negative current collector (made of a highly conductive material plate, e.g., a copper (Cu) or nickel (Ni) foil) and a negative active material layer coated on surfaces of the negative current collector. A negative current collector region (in which the negative active material layer is not formed, e.g., a negative electrode uncoated region) may be formed at ends of the negative electrode plate 220. One end of the negative electrode uncoated region may generally be made of a nickel (Ni) material; and a negative electrode tab 225 (upwardly protruding to the electrode assembly 200 by a predetermined length) may be attached to the one end of the negative electrode uncoated region.

The separator 230 may be disposed between the positive electrode plate 210 and the negative electrode plate 220. The separator 230 may extend to cover an outer peripheral surface of the electrode assembly 200. The separator 230 may help reduce the likelihood of or prevent a short between the positive electrode plate 210 and the negative electrode plate 220. The separator 230 may be made of a porous polymer material to facilitate passing of lithium ions therethrough. The separator 230 may be disposed between the positive electrode plate 210 and the negative electrode plate 220 to insulate the positive electrode plate 210 and the negative electrode plate 220 from each other. The separator 230 may be made of, e.g., polyethylene, polypropylene, or a composite film of polyethylene and polypropylene. In order to help prevent a short between the positive electrode plate 210 and the negative electrode plate 220, the separator 230 may have a width greater than a width of the positive electrode plate 210 or the negative electrode plate 220.

The cylindrical can 300 may include a cylindrical side surface plate 310 and may include space therein to accommodate the cylindrical electrode assembly 200. The cylindrical can 300 may include a bottom surface plate 320 sealing a bottom portion of the cylindrical side surface plate 310. In addition, an upper portion of the cylindrical side surface plate 310 may be opened to facilitate insertion of the electrode assembly 200 into the cylindrical can 300. The negative electrode tab 225 of the electrode assembly 200 may be attached to a center of the bottom surface plate 320 of the cylindrical can 300, thereby allowing the cylindrical can 300 to serve as a negative electrode. The cylindrical can 300 may be formed from, e.g., aluminum (Al), iron (Fe), or alloys thereof. The cylindrical can 300 may include a crimping part 330 that is inwardly bent from a top end thereof to press an upper portion of the cap assembly 400. The cylindrical can 300 may have an inwardly recessed beading part 340 at a location spaced apart (a distance corresponding to a thickness of the cap assembly 400) from the crimping part 330 to press the lower portion of the cap assembly 400.

The cap assembly 400 may include an upper cap 410, a safety vent 420, an insulator 430, a lower cap 440, and a current interruption part 450.

The upper cap 410 may include a protruding part 410a, a connection part 410b, a flange part 410c, and gas discharge holes 410d. The upper cap 410 may have a disk shape. The upper cap 410 may be disposed at a topmost part of the cap assembly 400 and may be coupled with other elements of the cap assembly 400. Thus, current generated in the lithium secondary battery 100 may be transmitted to an exterior thereof, e.g., to an external load.

The protruding part 410a may protrude from a center of the upper cap 410 and may have a convex disk shape. The protruding part 410a may be electrically connected to an external device or load and may form a discharge path for gas generated in an interior of the cylindrical can 300.

The connection part 410b may extend downwardly from an outer periphery of the protruding part 410a. The connection part 410b may include a plurality of gas discharge holes 410d therein.

The flange part 410c may extend outwardly from the connection part 410b. The flange part 410c may have a disk shape and may have a diameter greater than a diameter of the protruding part 410a. The flange part 410c may be parallel with the body part 610 of the washer 600 and may support the washer 600.

The gas discharge holes 410d may include a plurality of holes in the connection part 410b. Each of the gas discharge holes 410d may have, e.g., a roughly elliptical shape with a major axis and a minor axis. The gas discharge holes 410d may facilitate exhaustion of the gas generated in the interior of the cylindrical can 300.

The safety vent 420 may be made of a conductive material and may have a roughly disk shape. In an implementation, the safety vent 420 may be made of, e.g., aluminum or nickel. The safety vent 420 may include a protruding part 420a at a center thereof that protrudes downwardly and is positioned below other elements of the cap assembly 400. In the safety vent 420, the protruding part 420a may upwardly deform in response to a predetermined internal pressure in the lithium secondary battery 100. The positive electrode tab 215 (drawn out from one of the positive and negative electrode plates 210 and 220 of the electrode assembly 200, e.g., the positive electrode plate 210) may be welded to a predetermined position of a bottom surface of the safety vent 420, thereby facilitating electrical connection between the safety vent 420 and the positive electrode plate 210 of the electrode assembly 200. The other of the positive and negative electrode plates 210 and 220 of the electrode assembly 200, e.g., the negative electrode plate 220, may be electrically connected to the cylindrical can 300 directly or by a tab (not shown). The safety vent 420 may be deformable or fracturable in response to the internal pressure of the cylindrical can 300 increasing above a predetermined pressure, thereby causing the current interruption part 450 to be broken.

The insulator 430 may be between the safety vent 420 and the lower cap 440 to insulate the safety vent 420 and the lower cap 440 from each other.

The lower cap 440 may have a disk shape. The lower cap 440 may have a throughhole 440a in a center thereof; and the protruding part 420a of the safety vent 420 may protrude downwardly through the throughhole 440a.

The current interruption part 450 may be formed of a conductive material and may be coupled with a bottom surface of the lower cap 440. The protruding part 420a of the safety vent 420 may be coupled with a top surface of the current interruption part 450; and the positive electrode tab 215 may be electrically connected to and fixed to a bottom surface of the current interruption part 450. The protruding part 420a of the safety vent 420 may be coupled with the top surface of the current interruption part 450 through the throughhole 440a of the lower cap 440.

The gasket 500 may have a generally circular ring shape having top and bottom surfaces and may have a predetermined height. The gasket 500 may be inserted into the cylindrical can 300 through a top portion of the cylindrical can 300 and may be placed in or on the beading part 340. The cap assembly 400 may be inserted into the gasket 500 and disposed therein. Accordingly, the gasket 500 may be between the cap assembly 400 and the cylindrical can 300 and may seal a gap between the cap assembly 400 and an inner wall of the cylindrical can 300.

The gasket 500 may include an upper portion 500a, a mid portion 500b, and a lower portion 500c. However, the embodiments are not limited thereto, and the gasket 500 may have various shapes according to the shapes of the cap assembly 400 and the cylindrical can 300 of a cylindrical secondary battery and the connection relationship therebetween.

In the gasket 500, the upper portion 500a may be vertically formed, may have a predetermined height, and may be between a side surface of the cap assembly 400 and the inner wall of the cylindrical can 300. In addition, a top end of the upper portion 500a may be crimped with a top end of the cylindrical can 300 and may contact a top surface of the cap assembly 400. Accordingly, the upper portion 500a may contact the side surface and top surface of the cap assembly 400. The mid portion 500b may horizontally extend from a bottom end of the upper portion 500a. A bottom surface edge of the cap assembly 400 may contact a top surface of the mid portion 500b to be disposed thereon. In addition, a bottom surface of the mid portion 500b may contact the beading part 340 of the cylindrical can 300. Accordingly, the mid portion 500b may seal a gap between the bottom surface edge of the cap assembly 400 and the beading part 340 of the cylindrical can 300. The lower portion 500c may extend downwardly from a bottom end of the mid portion 500b and may prevent the beading part 340 of the cylindrical can 300 from electrically contacting the lower portion of the cap assembly 400 and the positive electrode tab 215.

The washer 600 may include a body part 610, a connection hole 620, and insertion parts 630.

The washer 600 may have a circular, flat plate shape. In an implementation, the washer 600 may be formed from paper. However, the embodiments are not limited thereto; and the washer 600 may be formed of an insulator such as rubber. The washer 600 may coupled with the upper cap 410 and may prevent foreign materials from permeating into the cylindrical can 300.

The body part 610 may have a substantially circular flat plate shape and may include the connection hole 620 at its center. In addition, the body part 610 may be separated by a predetermined distance from and substantially parallel with the flange part 410c of the upper cap 410. Accordingly, when the upper cap 410 is coupled with the washer 600, the body part 610 may support the assembled structure.

The connection hole 620 may take the form of a substantially circular hole. The connection hole 620 may facilitate coupling of the washer 600 with the upper cap 410.

Each of the insertion parts 630 may include an extension part 630a and a locking part 630b. The insertion parts 630 may extend inwardly from the body part 610. The insertion parts 630 may be inserted into the gas discharge holes 410d to then be engaged with the upper cap 410. Here, a number of insertion parts 630 may correspond to a number of the gas discharge holes 410d.

As described above, the extension part 630a may inwardly extend from the body part 610. The extension part 630a may have a width smaller than that of a long inner diameter of (e.g., a length of the major axis of or width of) each of the gas discharge holes 410d, so as to be inserted into the gas discharge holes 410d. When the washer 600 is coupled with the upper cap 410, a gap may be formed between the connection part 410b and the extension part 630a, thereby facilitating exhaustion of internal gas generated in the cylindrical can 300.

The locking part 630b may be formed at an end of the extension part 630a. The locking part 630b may have a circular shape. The locking part 630b may have a width, e.g., diameter, greater than a narrowest portion of the extension part 630a. In addition, the locking parts 630b may be formed at a predetermined angular distance. The locking parts 630b may be engaged with the gas discharge holes 410d so as to be positioned within the upper cap 410. Thus, the width, e.g., the diameter, of the locking part 630b may be smaller than the width, e.g., the longer inner diameter, of the gas discharge hole 410d.

The insertion parts 630 may be coupled with the gas discharge holes 410d, thereby preventing foreign materials from permeating into the upper cap 410 when the upper cap 410 is welded to a nickel tab (not shown).

After the upper cap 410 is coupled with the washer 600, the heat shrinkable tube 1700 may be provided at an exterior of the cylindrical can 300. The heat shrinkable tube 1700 may be formed from a soft polyethylene terephthalate (PET) resin having a high shock-absorbing property. For example, the heat shrinkable tube 1700 may be a polymer synthetic resin product, and may be shrinkable at a predetermined ratio of about 25% to about 75% when heat of about 90° C. to about 130° C. is applied. Thus, the heat shrinkable tube 1700 may entirely cover an external surface of the cylindrical can 300. The heat shrinkable tube 1700 may have a high insulating property. Thus, the heat shrinkable tube 1700 may prevent or reduce the likelihood of an electric short from occurring to the lithium secondary battery 100 while also protecting an external shape of the lithium secondary battery 100.

Figure 4:
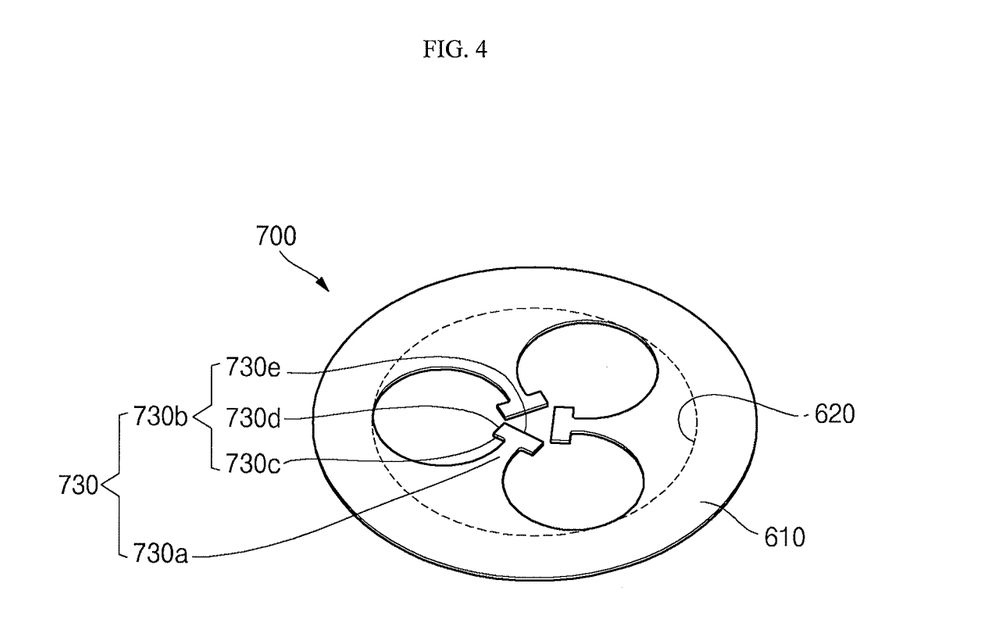
FIG. 4 illustrates a perspective view of a washer according to another embodiment.

FIG. 4 illustrates a perspective view of a washer 700 according to another embodiment.

Referring to FIG. 4, the washer 700 may include a body part 610, a connection hole 620, and insertion parts 730. Each of the insertion parts 730 may include an extension part 730a and a locking part 730b. The washer 700 according to the present embodiment is substantially the same as the washer 600 shown in FIG. 3, except for a configuration of the locking part 730b. Thus, the following description will focus on the configuration of the locking part 730b. The same components as those of the washer 600 are denoted by the same reference numerals; and a repeated detailed description thereof is omitted.

The locking part 730b may have a rectangular shape. The locking part 730b may have a first surface 730c, second surfaces 730d, and a third surface 730e. The first surface 730c may extend in a substantially right angle (90 degrees) direction at opposite sides of the extension part 730a. The second surfaces 730d may extend inwardly toward a center of the washer 700 from the first surface 730c in a 90 degree direction. The second surfaces 730d may have a length sufficient to prevent adjacent locking parts 730b from contacting each other. The third surface 730e may connect opposing second surfaces 730d and may be parallel with the first surface 730c.

Figure 5:
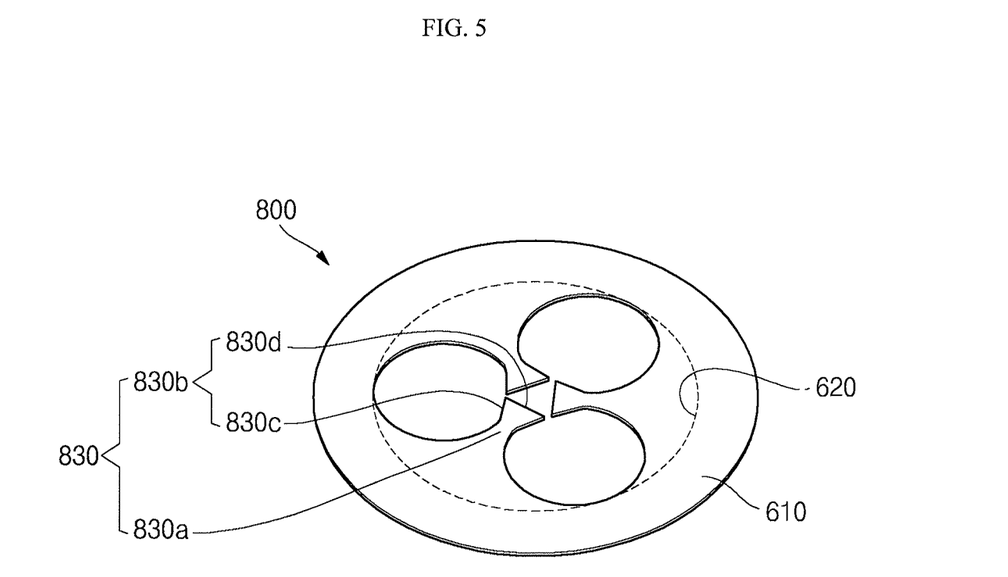
FIG. 5 illustrates a perspective view of a washer according to yet another embodiment.

FIG. 5 illustrates a perspective view of a washer according to yet another embodiment.

Referring to FIG. 5, the washer 800 may include a body part 610, a connection hole 620, and insertion parts 830. Each of the insertion parts 830 may include an extension part 830a and a locking part 830b. The washer 800 according to the present embodiment is substantially the same as the washer 600 shown in FIG. 3, except for a configuration of the locking part 830b. Thus, the following description will focus on the configuration of the locking part 830b of the washer 800. The same components as those of the washer 600 are denoted by the same reference numerals, and a repeated detailed description thereof is omitted.

The locking part 830b may have a funnel or funnel-like shape. The locking part 830b may have a first surface 830c and a second surface 830d. The first surface 830c may have a substantially V-shape in which a wedge is inclined relative to the extension part 830a such that opposing sides extend away from each other and inwardly toward a center of the washer 800. The second surface 830d may connect opposing first surfaces 830c.

Figure 6:
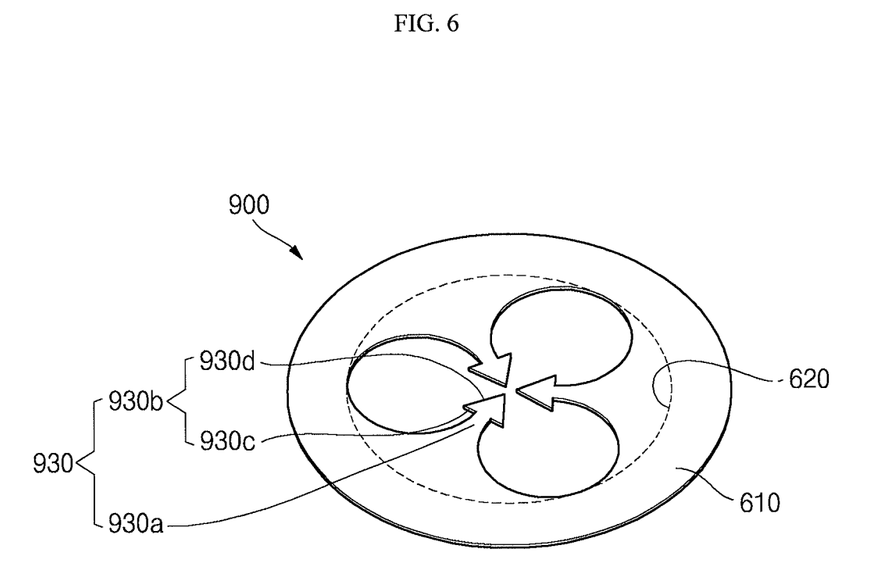
FIG. 6 illustrates a perspective view of a washer according to still another embodiment.

FIG. 6 illustrates a perspective view of a washer according to still another embodiment.

Referring to FIG. 6, the washer 900 may include a body part 610, a connection hole 620, and insertion parts 930. Each of the insertion parts 930 may include an extension part 930a and a locking part 930b. The washer 900 according to the present embodiment is substantially the same as the washer 600 shown in FIG. 3, except for a configuration of the locking part 930b. Thus, the following description will focus on the configuration of the locking part 930b of the washer 700. The same components as those of the washer 600 are denoted by the same reference numerals, and a repeated detailed description thereof is omitted.

The locking part 930b may have a triangular shape. For example, the locking part 930b may have a first surface 930c and a second surface 930d. The first surface 930c may extend at a substantially right angle (90 degrees) direction from opposite sides of the extension part 930a. Opposite second surface 930d may gradually get closer from opposite ends of the first surface 930c toward the center of the washer 900 until they contact each other.

Figure 7A:
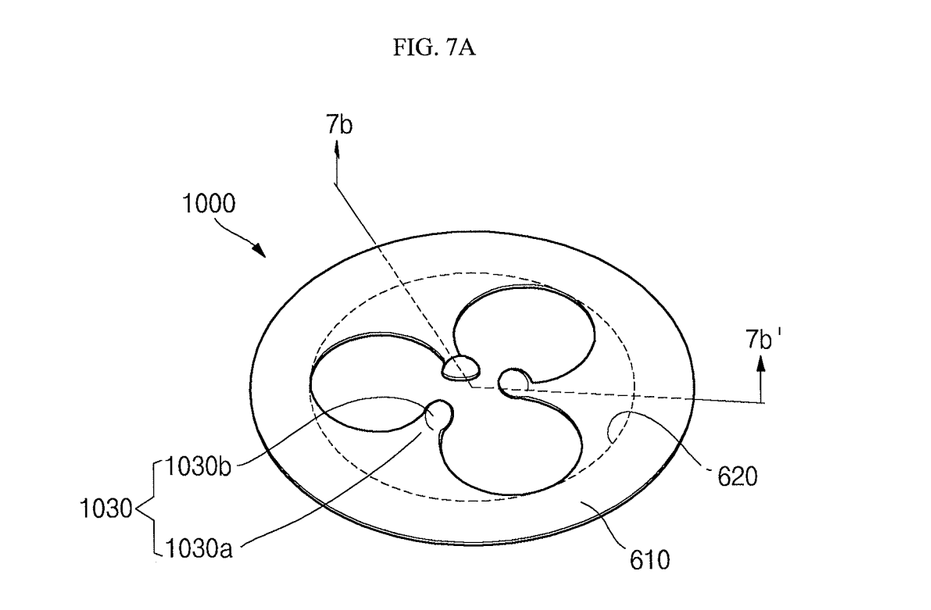
FIG. 7A illustrates a perspective view of a washer according to still another embodiment.
Figure 7B:
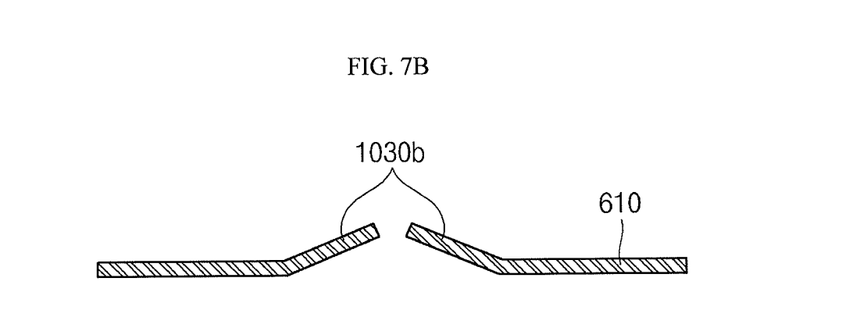
FIG. 7B illustrates a cross-sectional view taken along the line 7b-7b' of FIG. 7A.

FIG. 7A illustrates a perspective view of a washer according to still another embodiment. FIG. 7B illustrates a cross-sectional view taken along the line 7b-7b' of FIG. 7A.

Referring to FIG. 7A, the washer 1000 may include a body part 610, a connection hole 620, and insertion parts 1030. Each of the insertion parts 1030 may include an extension part 1030a and a locking part 1030b. The washer 1000 according to the present embodiment is substantially the same as the washer 600 shown in FIG. 3, except for a configuration of the locking part 1030b. Thus, the following description will focus on the configuration of the locking part 1030b. The same components as those of the washer 600 are denoted by the same reference numerals, and a repeated detailed description thereof is omitted.

The locking part 1030b may have a height. For example, the locking part 1030b may protrude upwardly, e.g., at an angle, toward the protruding part 410a from the body part 610. Thus, the locking part 1030b may be tightly fixed when it is fitted into the gas discharge hole 410d.

Figure 8A:
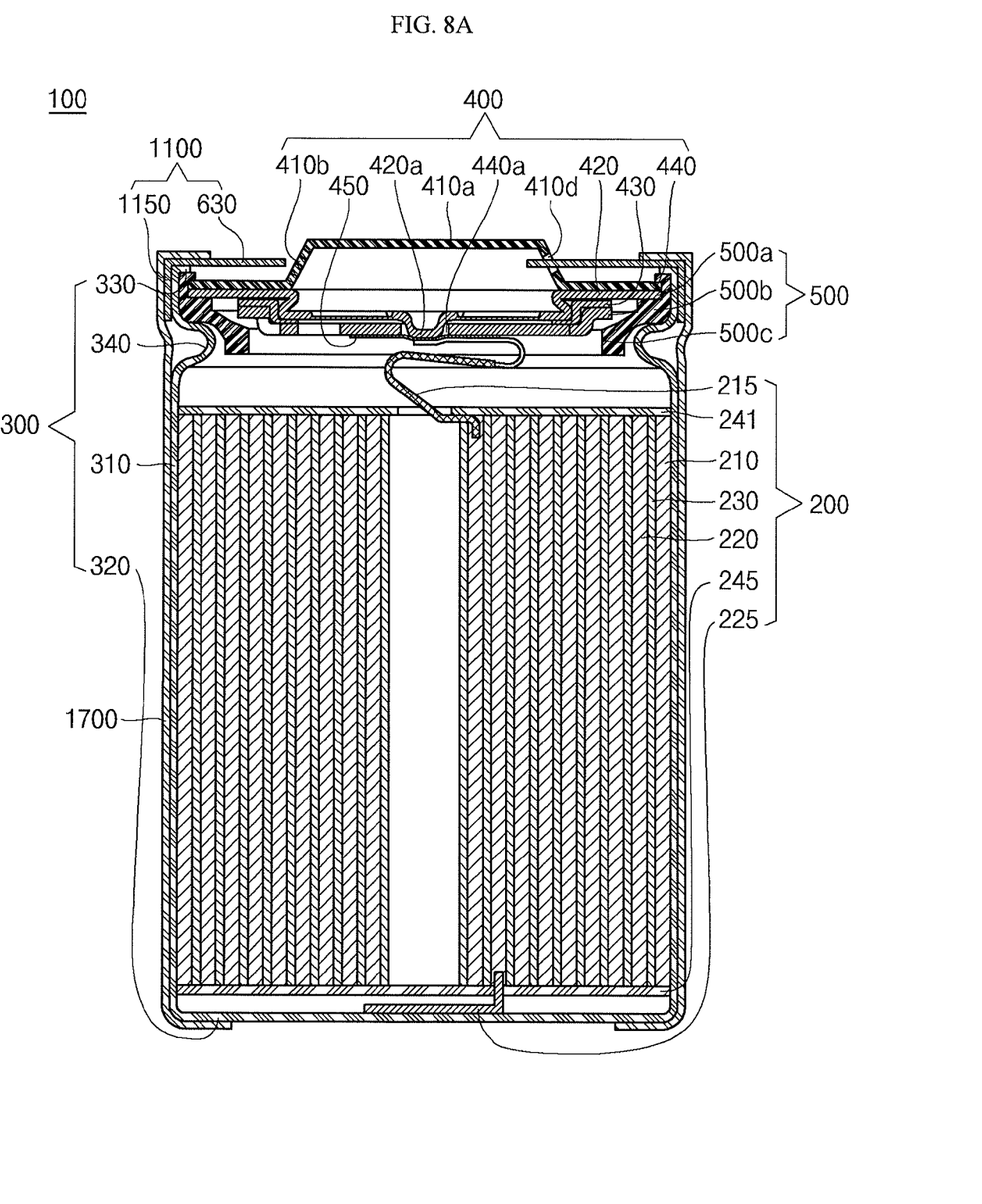
FIG. 8A illustrates a cross-sectional view of a lithium secondary battery according to another embodiment.
Figure 8B:
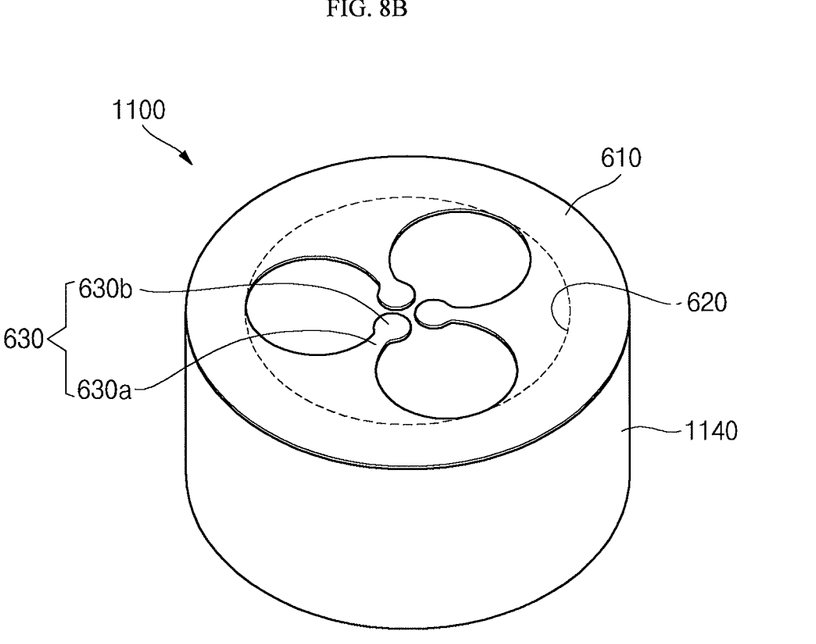
FIG. 8B illustrates a perspective view of a washer shown in FIG. 8A.

FIG. 8A illustrates a cross-sectional view of a lithium secondary battery according to another embodiment. FIG. 8B illustrates a perspective view of a washer shown in FIG. 8A.

Referring to FIGS. 8A and 8B, the washer 1100 may include a body part 610, a connection hole 620, insertion parts 630, and a lid portion 1140. For example, compared to the washer 600 shown in FIG. 3, the washer 1100 may further include the lid portion 1140. Thus, the following description will focus on the configuration of the lid portion 1140. The same components as those of the washer 600 are denoted by the same reference numerals, and a repeated detailed description thereof is omitted.

The lid portion 1140 may have a diameter greater than that of an upper cap 410 to cover portions of the upper cap 410 and the cylindrical can 300. In addition, the lid portion 1140 may extend to the side surface of the cylindrical can 300 along an outer periphery of the body part 610. Thus, if the cylindrical can 300 were to be damaged due to external shocks, the lid portion 1140 covering the upper side surface of the cylindrical can 300 may reduce the likelihood of or prevent an internal short.

According to the embodiments, the lithium secondary battery may include a washer on an upper portion of the cap assembly. Thus, even when the cap assembly is welded to a nickel tab and flames or heat are near the lithium secondary battery, the possibility of foreign materials permeating into the can may be reduced and/or prevented. Accordingly, internal shorts may be reduced or prevented in the lithium secondary battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A lithium secondary battery, comprising:
   an electrode assembly;
   a can accommodating the electrode assembly;
   a cap assembly coupled with the can, the cap assembly being positioned at a topmost part of the can and having an upper cap including gas discharge holes therein; and
   a washer coupled with the upper cap, the washer including
      a body part, the body part having a flat plate shape and having a centrally disposed connection hole; and
      insertion parts, the insertion parts insertably extending respectively through the gas discharge holes toward a center of the connection hole from the body part so as to be arranged in the gas discharge holes, the insertion parts including respective extension parts extending inwardly from the body part and respective locking parts, the locking parts being at distal ends of the respective extension parts, the locking parts having widths greater than minimum widths of their respective extension parts.

2. The lithium secondary battery as claimed in claim 1, wherein the locking parts and a portion of the respective extension parts adjacent thereto each have a width smaller than a width of one of the gas discharge holes.

3. The lithium secondary battery as claimed in claim 1, wherein each locking part has a circular shape.

4. The lithium secondary battery as claimed in claim 1, wherein each locking part has a rectangular shape.

5. The lithium secondary battery as claimed in claim 1, wherein each locking part has a funnel shape.

6. The lithium secondary battery as claimed in claim 1, wherein each locking part has a triangular shape.

7. The lithium secondary battery as claimed in claim 1, wherein the locking part protrudes upwardly toward the upper cap from the body part.

8. The lithium secondary battery as claimed in claim 1, wherein the washer has a lid portion extending along an outer periphery of the body part and covering an upper surface of the can.

9. The lithium secondary battery as claimed in claim 8, wherein an inner diameter of the lid portion is greater than an outer diameter of the upper cap.

10. The lithium secondary battery as claimed in claim 1, further comprising a heat shrinkable tube on an exterior of the can.

11. The lithium secondary battery as claimed in claim 10, wherein the heat shrinkable tube covers the coupled washer and upper cap.

12. The lithium secondary battery as claimed in claim 1, wherein the washer is formed of an insulator.

13. The lithium secondary battery as claimed in claim 1, wherein a gap exists between each of the insertion parts and an edge of the gas discharge hole through which each insertion part passes.

14. The lithium secondary battery as claimed in claim 1, further comprising a gasket including an upper portion, a mid-portion, and a lower portion, wherein the upper portion contacts a top surface and a side surface of the cap assembly, the mid-portion horizontally extends from a bottom end of the upper portion, the mid-portion having a top surface contacting a bottom surface edge of the cap assembly, and the lower portion extends downwardly from a bottom end of the mid portion and prevents the can from contacting a lower portion of the cap assembly.

15. The lithium secondary battery as claimed in claim 1, wherein the upper cap includes:
a protruding part extending from a center of the upper cap,
a connection part extending downwardly from an outer periphery of the protruding part, the connection part including the gas discharge holes, and
a flange part extending outwardly from the connection part.

16. The lithium secondary battery as claimed in claim 15, wherein the upper cap includes at least three gas discharge holes and the washer includes at least three insertion parts.

17. The lithium secondary battery as claimed in claim 15, wherein the locking parts form a partial barrier between the protruding part of the upper cap and an interior of the secondary battery.

18. A lithium secondary battery, comprising:
an electrode assembly;
a can accommodating the electrode assembly;
a cap assembly coupled with the can, the cap assembly being positioned at a topmost part of the can and having an upper cap, the upper cap including
gas discharge holes therein,
a protruding part extending from a center of the upper cap,
a connection part extending downwardly from an outer periphery of the protruding part, the connection part including the gas discharge holes, and
a flange part extending outwardly from the connection part; and
a washer coupled with the upper cap, wherein the washer includes:
a body part, the body part having a flat plate shape and having a centrally disposed connection hole; and
insertion parts, the insertion parts extending toward a center of the connection hole from the body part and being arranged in the gas discharge holes, and each of the insertion parts including
an extension part extending inwardly from the body part, and inserted into and extending through the gas discharge holes, and
a locking part formed at an end of the extension part, the locking part protruding upwardly toward the protruding part from the body part and having a width greater than a minimum width of the extension part,
wherein a gap exists between each of the insertion parts and an edge of the gas discharge hole through which each insertion part passes, and the locking part and a portion of the extension part adjacent thereto each have a width smaller than a width of one of the gas discharge holes.

* * * * *